United States Patent
Darke et al.

(10) Patent No.: US 7,837,752 B2
(45) Date of Patent: Nov. 23, 2010

(54) WATER REMOVAL DOWNSTREAM OF A TURBINE

(75) Inventors: Ranjit R. Darke, Los Angeles, CA (US); Michael B. Faust, Redondo Beach, CA (US); Allen K. MacKnight, Signal Hill, CA (US); Russell Johnson, Elmhurst, IL (US); Alexander M. Bershitsky, Glenview, IL (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 11/949,200

(22) Filed: Dec. 3, 2007

(65) Prior Publication Data
US 2009/0139403 A1 Jun. 4, 2009

(51) Int. Cl.
*B01D 50/00* (2006.01)

(52) U.S. Cl. .................... 55/385.1; 55/320; 55/337; 55/391; 55/392; 55/394; 55/396; 55/397; 55/399; 55/441; 55/447; 55/DIG. 17; 55/DIG. 23; 55/DIG. 14; 55/456; 55/457; 55/321; 55/319; 55/348; 55/455; 55/423; 95/268; 95/269; 96/191; 62/86; 62/87; 62/401; 62/402; 62/DIG. 5

(58) Field of Classification Search ............... 55/358.1, 55/320, 337, 391, 392, 394, 396, 397, 399, 55/441, 447, DIG. 17, DIG. 23, DIG. 14, 55/456, 457, 321, 319, 348, 455, 423, DIG. 46; 95/268, 269; 96/191; 62/86–97, 401–402, 62/DIG. 5
See application file for complete search history.

(56) References Cited

U.S. PATENT DOCUMENTS

| | | | |
|---|---|---|---|
| 3,676,987 A * | 7/1972 | Wunder et al. ............. 55/459.1 |
| 4,251,242 A | 2/1981 | Ito | |
| 4,543,108 A | 9/1985 | Wurz | |
| 5,172,753 A * | 12/1992 | Kadle et al. ................ 165/42 |
| 5,653,786 A * | 8/1997 | Taylor et al. ............... 95/268 |
| 5,885,333 A * | 3/1999 | Dix .......................... 96/190 |
| 5,922,130 A * | 7/1999 | Mosser et al. .............. 118/326 |
| 5,985,004 A | 11/1999 | Boyd | |
| 6,331,195 B1 * | 12/2001 | Faust et al. ................. 55/396 |
| 6,451,093 B1 | 9/2002 | Miles | |
| 6,488,485 B1 | 12/2002 | Rupp | |
| 6,505,474 B2 * | 1/2003 | Sauterleute et al. .......... 62/172 |

(Continued)

FOREIGN PATENT DOCUMENTS

EP    12252 A1 *  6/1980

*Primary Examiner*—Jason M Greene
*Assistant Examiner*—Dung Bui
(74) *Attorney, Agent, or Firm*—Oral Caglar, Esq.

(57) ABSTRACT

A rigid or semi-rigid demister pad is positioned between an air turbine and an inertial water removal device such as extractor in an air conditioning system for an aircraft. The demister pad comprises packed fibers or strands whose diameter typically ranges from approximately 10 or fewer microns to approximately 280 microns. The demister is capable of catching very small droplets discharged from the air turbine that coalesce into larger droplets that exit the demister pad and enter an adjacent water removal device downstream from the pad to separate the larger water droplets from the stream of air. This avoids using a water separator containing a coalescer bag that requires frequent maintenance and is sensitive to dirt and freezing. The demister can operate at freezing temperature, is not dirt-sensitive and requires no maintenance.

18 Claims, 5 Drawing Sheets

U.S. PATENT DOCUMENTS

| | | |
|---|---|---|
| 6,524,373 B2 | 2/2003 | Afeiche et al. |
| 6,648,939 B2 | 11/2003 | Neuschwander |
| 6,705,092 B1 * | 3/2004 | Zhou et al. .................. 62/87 |
| 6,843,836 B2 * | 1/2005 | Kitchener .................. 96/234 |
| 7,115,150 B2 * | 10/2006 | Johnson et al. ............. 55/486 |
| 7,125,439 B2 * | 10/2006 | Bennett .................... 95/268 |
| 7,235,177 B2 * | 6/2007 | Herman et al. ........... 210/360.1 |
| 7,305,842 B1 * | 12/2007 | Schiff ...................... 62/244 |
| 7,387,656 B2 * | 6/2008 | Ziebold et al. ............. 55/486 |
| 7,591,869 B2 * | 9/2009 | Jensen et al. .............. 55/396 |
| 2002/0088245 A1 * | 7/2002 | Sauterleute et al. ......... 62/402 |
| 2002/0121103 A1 * | 9/2002 | Udobot et al. ............. 62/402 |
| 2003/0010002 A1 * | 1/2003 | Johnson et al. ............. 55/486 |
| 2007/0175191 A1 * | 8/2007 | Ziebold et al. ............. 55/482 |
| 2008/0271421 A1 * | 11/2008 | Darke et al. ............... 55/396 |

* cited by examiner

WATER REMOVAL DOWNSTREAM OF A TURBINE

BACKGROUND OF THE INVENTION

The present invention generally relates to apparatus and methods for treatment of air streams in an environmental control system to remove water vapor, and more particularly, to apparatus and methods of improving the operation of a subsystem of the environmental control system made of an air turbine and a water removal device downstream from the turbine.

In the aerospace industry, aircraft typically have sophisticated environmental control systems where humid air is often transported into the system and is cooled. When the humid air is cooled, water vapor from the air condenses and water droplets are formed. The entrained water must be removed from the air stream in order to protect rotating machinery and electronics. Excessive water can also create passenger and pilot discomfort. Removing as much water as possible from the air also benefits the hardware, electronics, crew as well as the performance of the system.

In some systems, the water is condensed when the air stream is cooled in the air turbine. The problem is that the droplets of water created and discharged by the air turbine are usually difficult to remove with conventional methods because the droplets are extremely small. Typically, an inertial water separator downstream of the turbine takes the water droplets and applies centrifugal forces to separate the water from the air stream. The typical water separator would be a large housing containing a built-in coalescer bag made of cloth inside the housing. The coalescer bag converts small droplets into larger droplets and the water separator device swirls the air to cause the water droplets to separate from the air stream.

One problem is that the coalescer bag, although efficient under optimal conditions, is sensitive to dirt, which means that if the air contains particles of dirt, which it often does, the coalescer bag cannot function properly. A further problem with this subsystem is that the coalescer bag is also sensitive to icing, which means that if the water in the air freezes, the coalescer bag also cannot function properly. Since these are relatively frequent conditions, a water separator containing a coalescer bag is not an ideal way to remove water. Yet another problem with the coalescer bag is that it requires frequent maintenance, which can be costly.

As can be seen, there is a need for an improved apparatus and method that can efficiently remove water from the air stream in these systems which does not have the undesirable sensitivities of the prior art and which has low maintenance requirements. Furthermore, there is a need to accomplish this with a simple apparatus and method that is efficient and cost-effective.

SUMMARY OF THE PRESENT INVENTION

In one aspect of the present invention, an air treatment assembly is presented for treating a stream of air that contains water, the assembly comprising an air turbine located upstream, a demister pad located downstream of the air turbine, the demister pad capable of coalescing small water droplets from the air turbine into larger droplets that exit the demister pad, and an inertial water removal device located downstream of the demister pad.

In another aspect of the invention, there is presented a method of removing water from a stream of air, comprising passing pressurized air through an air turbine to cause small water droplets to form and be discharged from the air turbine, coalescing the small water droplets into larger water droplets in a demister pad, and separating the larger water droplets from the stream of air by passing the larger water droplets exiting the demister pad into an inertial water removal device downstream from the demister pad.

In a further aspect of the invention, there is presented an aircraft air conditioning subsystem connected to an air turbine, the subsystem comprising a demister pad located downstream of the air turbine and adjacent the air turbine, the demister pad capable of coalescing small water droplets from the air turbine into larger water droplets that exit the demister pad, and an inertial water removal device comprising a water extractor located downstream of the demister pad and adjacent the demister pad, the inertial water removal device capable of receiving the larger droplets that exit the demister pad and separating the large water droplets from the stream of air.

These and other features, aspects and advantages of the present invention will become better understood with reference to the following drawings, descriptions and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an air treatment assembly that is a subsystem of an air conditioning or environmental control system. The air treatment assembly may include an air turbine, a demister pad downstream of the air turbine and an inertial water removal device downstream of the demister pad. The air treatment assembly of the present invention may be especially suited for use with air turbines, which may move a substantial amount of air, which is a gas that may contain water within it. More broadly, the assembly may be usable for any liquid in an air stream. As an air stream flows into the air turbine, water in the air may be cooled and droplets discharged that impact the fibers or strands in the adjacent downstream demister pad. Larger droplets of water may exit the demister pad and enter the water removal device.

In contrast to the prior art, the treatment assembly may include a demister pad and an inertial water removal device such a water extractor whereas prior art devices include no demister pad and instead rely on a water separator that is bigger than a water extractor, which water separator houses a built-in coalescer bag. Unlike the coalescer bag of the prior art, which may have a porosity of under 0.15 cubic inches per cubic inches, the porosity of the demister pad typically ranges from approximately 0.5 to approximately 0.95 cubic inches per cubic inches Use of the demister pad may avoid using a water separator containing a cloth coalescer bag that requires frequent maintenance and is sensitive to dirt and freezing. The demister pad of the present invention may be capable of operating at below freezing temperature for two minutes at approximately 70 grams per pound total humidity, may not being dirt-sensitive and may require virtually no maintenance. This may prevent breakdown of the assembly and the subsystem from flash freezing.

Figure 3:
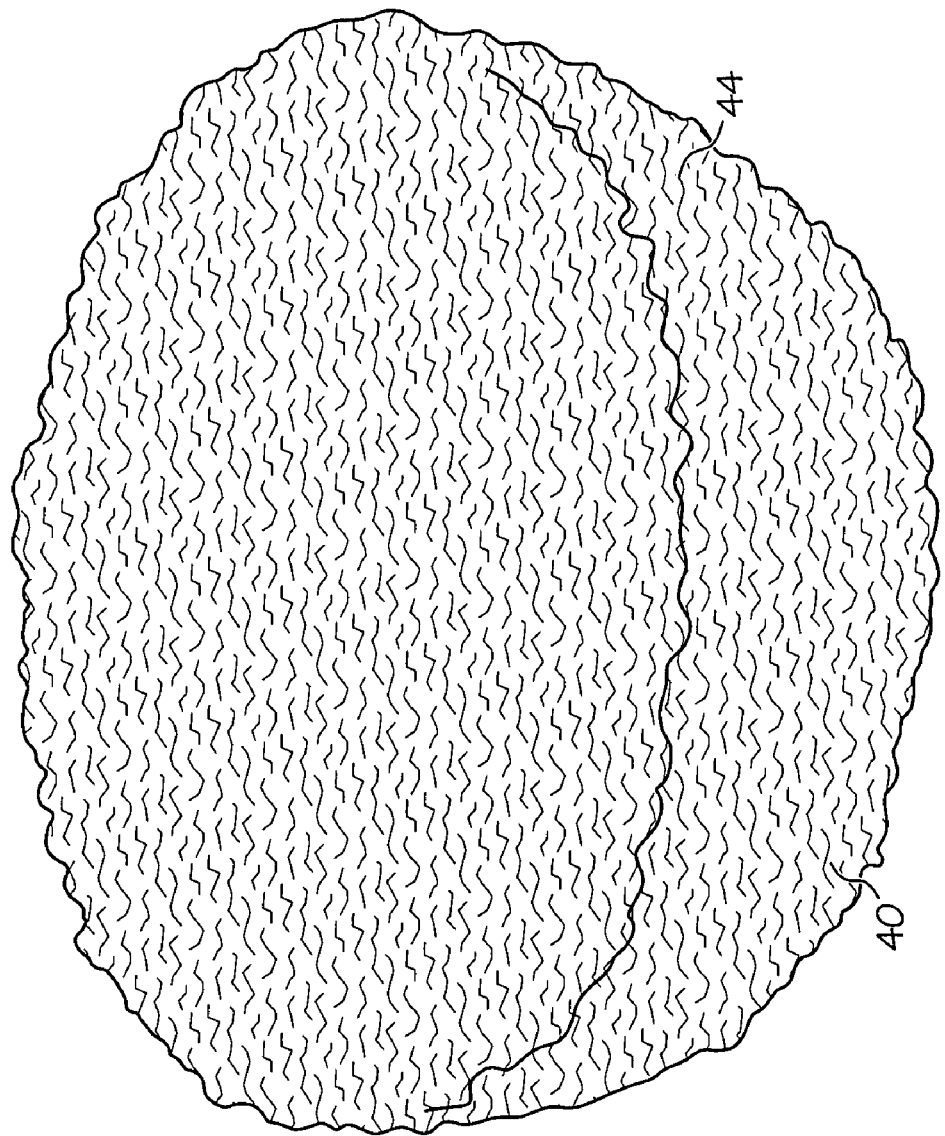
FIG. 3 is a front and side perspective view of the demister pad used in the assembly of the present invention.

As seen from FIG. 1, an air treatment assembly 10 for treating a stream of air 11 containing water or another liquid may comprise an air turbine 20 located upstream (meaning earlier in the movement of the stream of air 11), an inertial water removal device 30 located downstream (meaning later in the movement of the stream of air 11) and a demister pad 40 between air turbine 20 and water removal device 30. In an exemplary embodiment, pressurized humid air may pass through air turbine 20 where the air stream 11 is cooled. In air turbine 20, the water vapor in the air may be condensed into very fine liquid droplets. Air turbine 20 may discharge the very fine liquid droplets of water directly into demister pad 40 where they impact the strands or fibers (see FIGS. 3 and 4) of the demister pad 40 and coalesce into larger droplets. The demister pad 40 may be located downstream of the air turbine 20. Larger droplets of water may then exit demister pad 40 and enter the water removal device 30 which is downstream from the demister pad 40. In one embodiment of the present invention, demister pad 40 may be downstream and adjacent air turbine 20 and water removal device 30 may be downstream and adjacent demister pad 40.

For example, fine water droplets of between approximately 0.05 microns to approximately 5.0 microns may be discharged from the air turbine and enter demister pad 40. Larger droplets of water such as droplets approximately 10 microns or larger in diameter may exit demister pad 40 and enter water removal device 30. The increase in water droplet size may serve to improve the efficiency of inertial water removal device 30 because in an inertial device, bigger water droplets having larger weight are easier to separate from air stream 11 than smaller ones.

The water removal device may be an inertial water removal device 30, for example a water extractor, and its purpose may be to remove water droplets from the stream of air 11 exiting the demister pad 40. Inertial water removal device 30 may be capable of receiving the larger droplets that exit demister pad 40 and separating the large water droplets from the stream of air. A water extractor may be of the kind described in U.S. Pat. No. 6,331,195 B1 or U.S. Pat. No. 6,524,373 B2, herein incorporated in their entirety by reference, where the water extractor includes a swirl section and a water collector section. In these water extractors, the swirl section may separate the water droplets from the air using centrifugal force and the water collector may collect the water and allow the air stream to move on. Other examples of inertial water removal devices other than extractors include water removal devices comprising vertical staggered plates that may induce side-to-side disturbance in the air flow and cause droplets to be caught in the blades. In contrast to water separators, water extractors may swirl the air using a static swirl vane allowing dry air to continue downstream.

Figure 1:
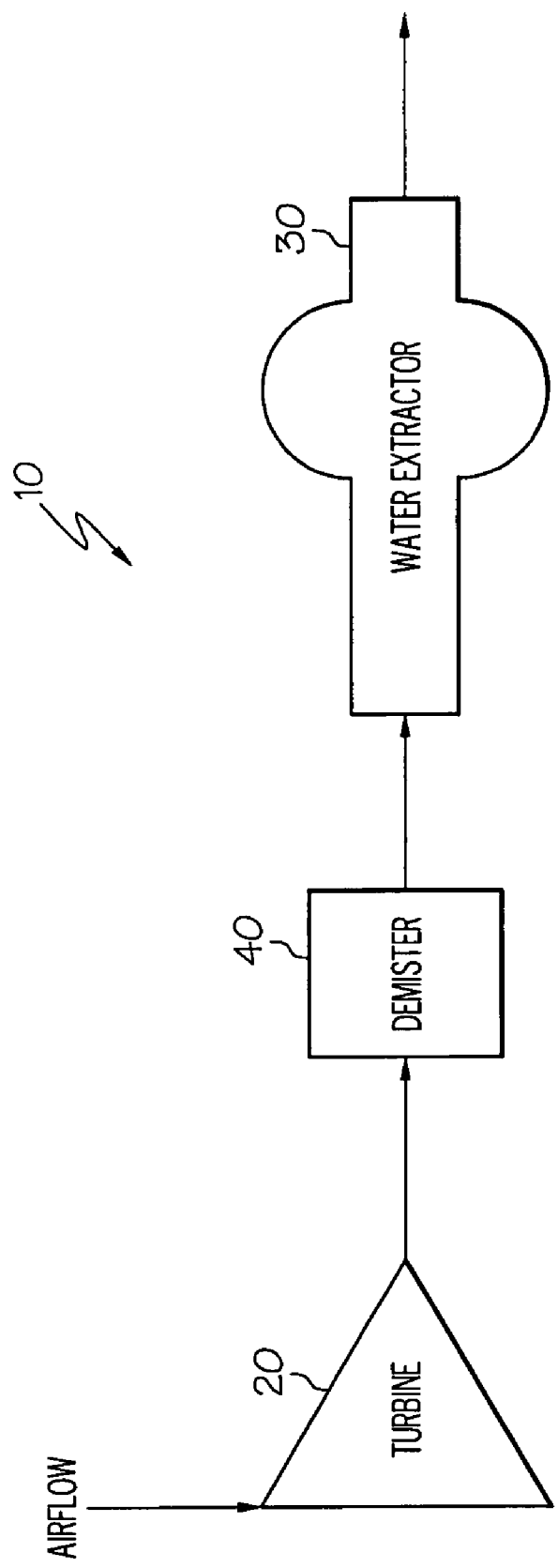
FIG. 1 is a schematic diagram of the air treatment assembly of the present invention including the air turbine, demister pad and inertial water removal device.

It should be understood that the arrows in FIG. 1 representing the air flow between turbine 20 and demister pad 40 and between demister pad 40 and inertial water removal device (i.e. water extractor 30) are not intended to indicate any particular distance between these elements, since demister pad 40 may be immediately adjacent turbine 20 and inertial water removal device 30.

Figure 2:
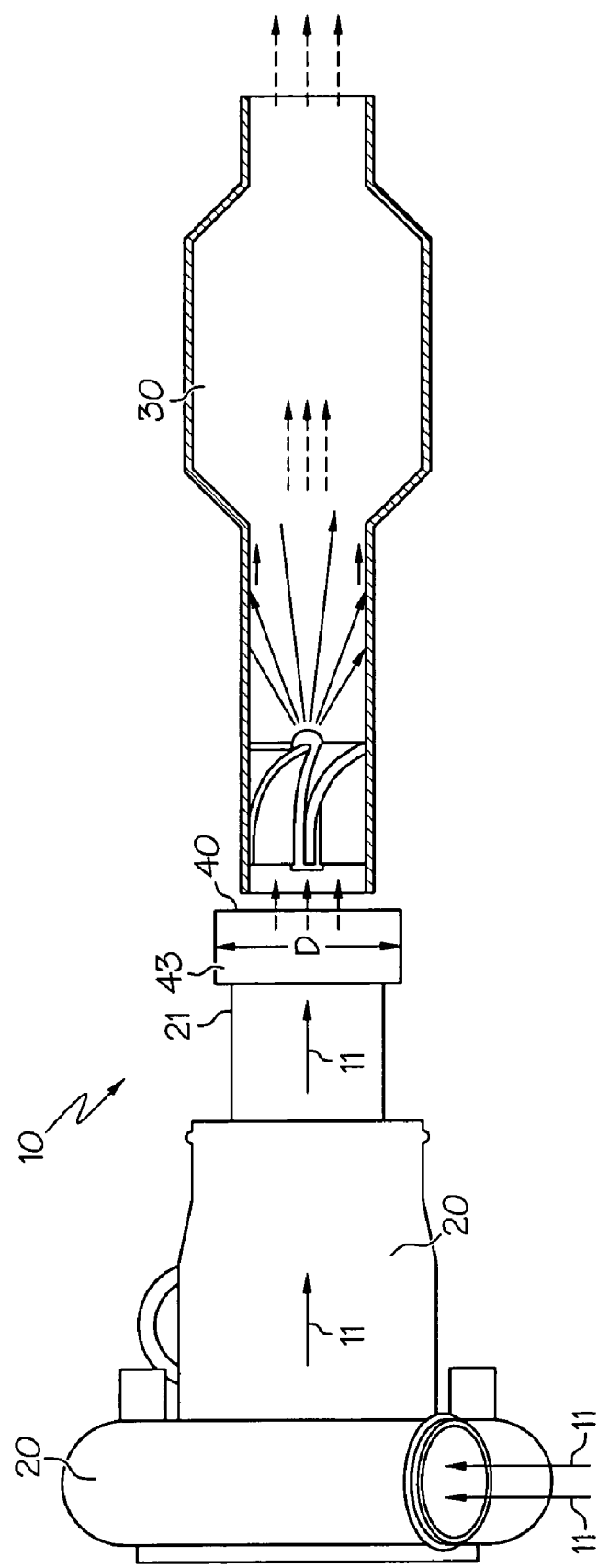
FIG. 2 is a partial perspective view of the air treatment assembly of the present invention including a sectional view of the inertial water removal device.

As seen from FIG. 2, demister pad 40 may be encased in a short metal cylindrical pipe 43 or duct whose diameter D makes it conveniently attachable to the ducting 21 at the downstream end of air turbine 20. Demister pad 40 may receive the fine or very small droplets of water discharged from the air turbine 20 and larger droplets of water may exit the demister pad 40 which is positioned between the air turbine 20 and the inertial water removal device 30 and adjacent to both, as seen from FIGS. 1 and 2. Since larger water droplets enter the inertial water removal device 30 than otherwise would if there were no demister pad 40, the greater centrifugal forces operating on the larger water droplets (as compared to smaller water droplets that would enter the inertial water removal device 30 without the demister pad 40) enhance separation of the trajectory of the water from the air flow.

Demister pad 40 may generally be comprised of a fixed-phase material such as a solid, with such material presenting a high geometric surface to the passing gas stream. As seen from FIG. 3 demister pad 40 may be made of fibers and/or strands 44 packed together to form a rigid or semi-rigid pad. The fibers or strands 44 may be made of any suitable material known to those skilled the art to form a rigid or semi-rigid pad 40. Typical materials used in demister pads may include but are not limited to metal, for example aluminum (for wire demisters), plastic, fiber and fiberglass. In certain cases, demister pad 40 may even be made from a non-rigid material.

Typically, the diameter of fibers or strands 44 of demister pad 40 may range from approximately 10 to approximately 280 microns (or may range more broadly in certain cases from approximately 1 micron to approximately 280 microns) while the water droplets themselves may have diameters in the range of approximately one to 20 microns. Although the term "small water droplets" is relative, typically, small water droplets in the stream of air may be considered droplets whose diameter is in the range of approximately 0.5 microns or less to approximately 5 microns. A stream of air entering demister pad 40 may also have a majority of droplets whose diameter is in the range of approximately 0.5 microns or less to approximately 5 microns.

Generally, the smaller the diameter of the droplets, the smaller the diameter of the fibers or strands 44 in demister pad 40. Generally, the diameter of fibers or strands 44 of demister pad 40 may be chosen so as to be larger than the diameter of the smallest water droplet(s) in the air stream. On the other hand, the diameter of fibers or strands 44 should be kept as small as possible to be effective in catching the small droplets of water entrained in the stream of air exiting air turbine 20 and allowing the small water droplets to coalesce into larger water droplets that exit the demister pad 40. Fiber or strands 44 should be capable of making a sufficient number of larger water droplets to meet the droplet coalescer requirements provided by the system without driving up the amount of energy needed to push air through the system.

For example, in cases where the droplets entering demister pad 40 may be very small, the diameter of the fibers or strands may be less than approximately 10 microns. However, the present invention is not limited to use of a demister whose strands or fibers are smaller than 10 microns because the size of the diameter of the strands or fibers of the pad is application-specific. For example, if the water droplets coming out of the air turbine are large, one might justify using a demister pad whose strands or fibers 44 have a diameter larger than 10 microns, for example as high as 100 microns or larger, and still be effective at coalescing the water droplets into larger droplets.

Generally, the smaller the diameter of the fiber or strands 44 in demister 40 the greater the efficiency of the demister 40. But there is a trade-off since the smaller the diameter of the fibers or strands, the greater the pressure drop and the greater the energy needed to push the air through the system. The energy needed to push the air through the system may be a variable that one wants to minimize.

In addition, the porosity of demister pad 40, which measures the spacing between fibers or strands 44 typically ranges from approximately 0.5 to approximately 0.95.inches cubed per inches cubed In order to simplify the language of this patent application, including in the claims, the term "strands" or "strand" may include both strand(s) and/or fiber(s).

The density of the packing of the strands 44 and the number of strands 44 in the demister may vary according to the needs of the application. Furthermore, the diameter of the demister pad 40 may vary with the application. For example, larger aircraft may have a large air conditioning system having greater/faster air flow and may require a larger diameter demister pad 40. The demister pad 40 may typically range between approximately one and approximately 12 inches in diameter, and in certain exemplary embodiments may be four and one half inches in diameter. The thickness of the demister pad 40 is also application specific. Typically, demister pad 40 may range between approximately 1 and approximately 4 inches thick but this is not absolute.

Demister pad 40 may come in a variety of shapes, including but not limited to disk-shaped, cone-shaped and chevron.

Figure 4:
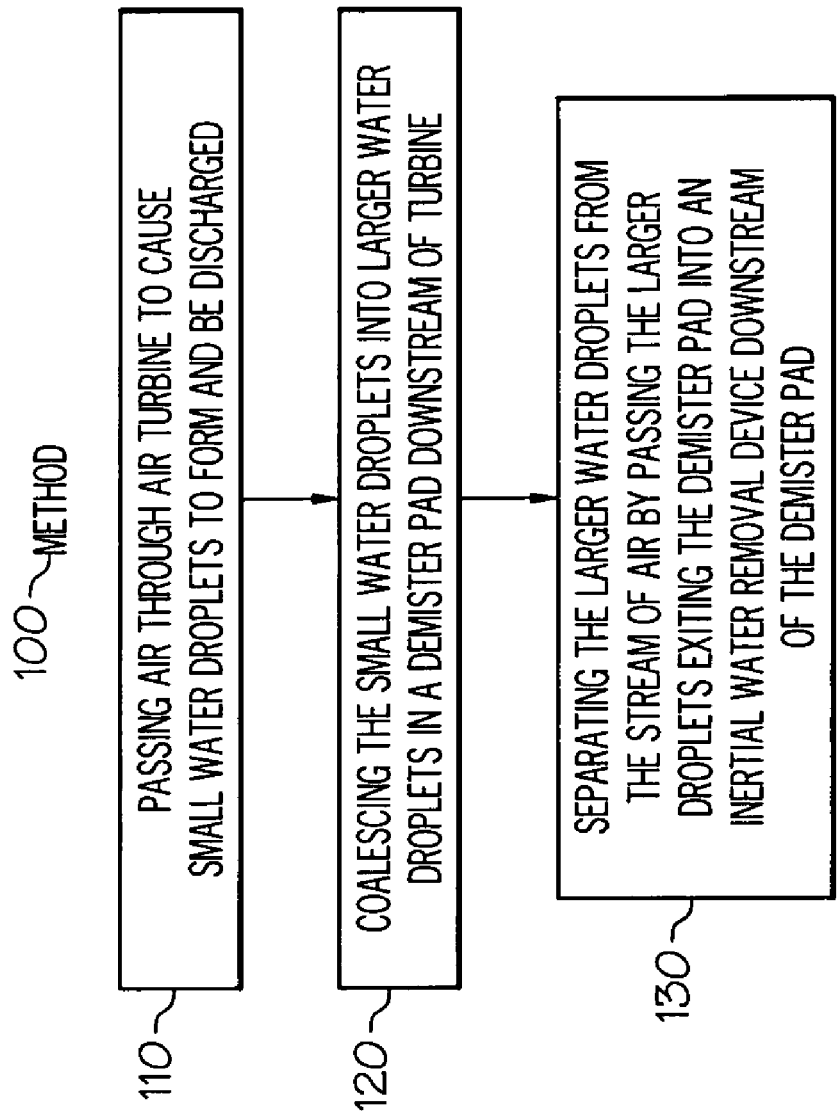
FIG. 4 is a flow chart showing the method of the present invention.

As can be seen from FIG. 4, which is a flow chart, the present invention may also be expressed as a method 100 of removing water from a stream of air. Method 100 may include the step 110 of passing pressurized humid air through an air turbine to cause small water droplets to form and be discharged from the air turbine. In a further step 120, method 100 may involve coalescing the small water droplets into larger water droplets by passing the small water droplets into strands or fibers of demister pad 40, demister pad 40 located downstream from the air turbine, the strands having a diameter small enough to cause the small water droplets to coalesce into larger water droplets. The method may further comprise a step 130 of separating the larger water droplets from the stream of air 11 by passing the larger water droplets exiting demister pad 40 into an inertial water removal device downstream from the demister pad 40.

A further method is presented for removing water droplets discharged from an air turbine, comprising passing the water droplets through a demister pad downstream from the air turbine to convert the water droplets into larger water droplets, and passing the larger water droplets exiting the demister pad into an inertial water removal device to separate the larger water droplets from the stream of air.

In these methods, the inertial water removal device may be downstream from the demister pad and the demister pad may be adjacent the air turbine. Furthermore, the demister pad 40, water removal device 30 and air turbine 20 may have the structural characteristics previously described herein.

Figure 5:
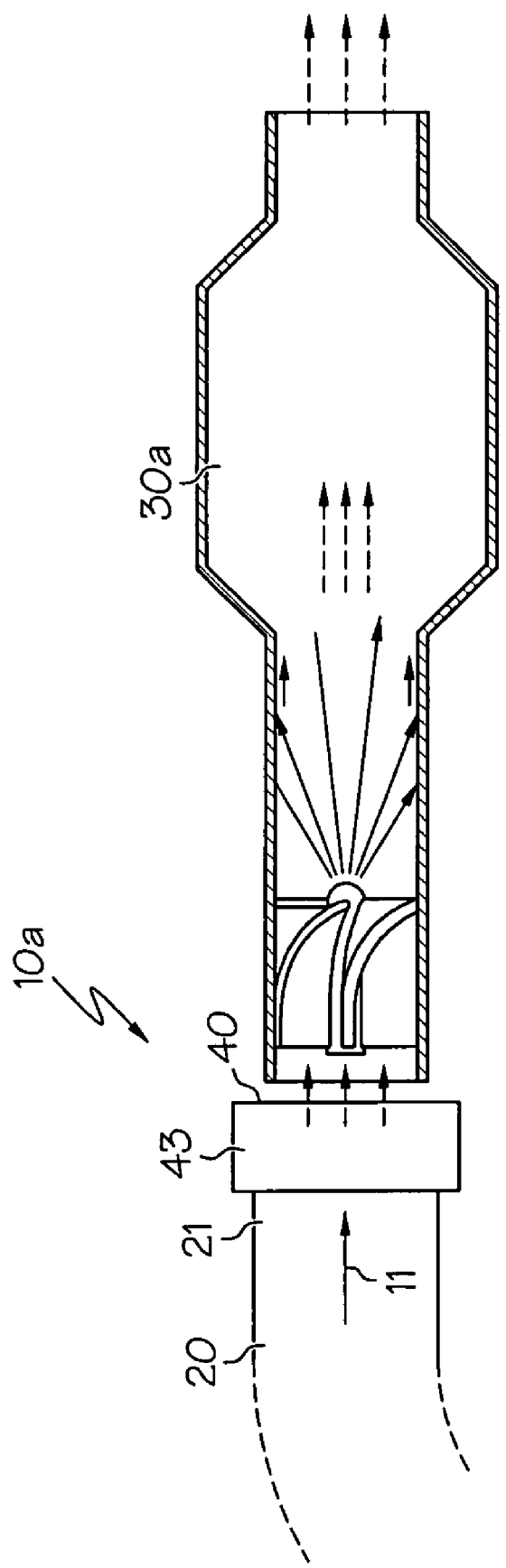
FIG. 5 is a perspective view of the subsystem of the present invention including the demister pad and the inertial water removal device.

As seen from FIG. 5, the present invention may also encompass an aircraft air conditioning subsystem 10*a* connected to an air turbine 20, the subsystem 10*a* may comprise a demister pad 40 located downstream of air turbine 20, demister pad 40 may be made of strands 44 packed together wherein strands 44 may have diameters larger than a diameter of a smallest water droplet in the stream of air. Strands 44 may be capable of catching small water droplets entrained in a stream of air exiting air turbine 20 and allowing the small water droplets to coalesce into larger water droplets that exit demister pad 40. Subsystem 10*a* may also include an inertial water removal device located downstream of demister pad 40, which may be a water extractor 30*a*. Water extractor 30*a* may be capable of receiving the larger droplets that exit demister pad 40 and separating the large water droplets from the stream of air 11. FIG. 5 is merely illustrative of the components of water extractor 30*a*; accordingly, the inner components depicted therein are only exemplary.

It should be understood, of course, that the foregoing relates to exemplary embodiments of the invention and that modifications may be made without departing from the spirit and scope of the invention as set forth in the following claims.

We claim:

1. An air treatment assembly for removing water from a stream of air containing water, comprising:
   an air turbine;
   an inertial water removal device located downstream of the air turbine;
   a demister pad located between the air turbine and the inertial water removal device, the demister pad capable of coalescing water droplets from the air turbine into larger water droplets that exit the demister pad and enter the inertial water removal device;
   wherein the demister pad is made of strands packed together, the strands having a porosity between approximately 0.5 to approximately 0.95;
   wherein the water in the airstream is collected in a water collector of the inertial water removal device; and
   wherein none of the water that is collected in the air treatment assembly is collected in the demister pad.

2. The air treatment assembly of claim 1, wherein the strands have diameters larger than approximately one micron.

3. The air treatment assembly of claim 1, wherein the inertial water removal device is a water extractor.

4. The air treatment assembly of claim 1, wherein the demister pad is rigid or semi-rigid.

5. The air treatment assembly of claim 1, wherein the demister pad is between approximately 1 and approximately 12 inches in diameter.

6. The air treatment assembly of claim 1, wherein the demister pad is disk-shaped, cone-shaped or chevron-shaped.

7. The air treatment assembly of claim 6, wherein the demister pad is shaped like a disk.

8. A method of removing water from a stream of air in an air conditioning system, comprising:
   passing air through an air turbine to cause small water droplets to form and be discharged from the air turbine;
   coalescing the small water droplets into larger water droplets in a demister pad, the demister pad being made of strands packed together;
   flowing air through the demister pad to carry the larger water droplets to an inertial water removal device downstream from the demister pad;
   separating the larger water droplets from the stream of air by passing the larger water droplets exiting the demister pad into an inertial water removal device downstream from the demister pad; and
   collecting water from the airstream only in a water collector of the inertial water removal device.

9. The method of claim 8, wherein the demister pad is adjacent the air turbine and adjacent the inertial water removal device.

10. The method of claim 8, wherein the demister pad is rigid or semi-rigid.

11. The method of claim 8, wherein the demister pad is cone-shaped or chevron-shaped.

12. The method of claim 8, wherein the demister pad has a diameter of between approximately one inch and approximately 12 inches.

13. An aircraft air conditioning subsystem connected to an air turbine, the subsystem comprising:

a demister pad located downstream of the air turbine and adjacent the air turbine, the demister pad capable of coalescing small water droplets from the air turbine into larger water droplets that exit the demister pad, the demister pad being made from fibers or strands, the demister pad having a porosity from approximately 0.5 to approximately 0.95;

an inertial water removal device comprising a water extractor, the inertial water removal device located downstream of the demister pad and adjacent the demister pad, the inertial water removal device capable of receiving the larger droplets that exit the demister pad and separating the large water droplets from the stream of air; and the demister configured to allow all of the water that enters the demister to emerge into the inertial water removal device so that all water that is removed from the air stream by the subsystem is collected in a water collector of the inertial water removal device.

14. The subsystem of claim 13, wherein the demister pad is encased in a duct.

15. The subsystem of claim 13, wherein the demister pad is rigid or semi-rigid.

16. The subsystem of claim 13, wherein a thickness of the demister pad is between approximately 1 and approximately 4 inches.

17. The subsystem of claim 13, wherein the demister pad is disk-shaped.

18. The subsystem of claim 13, wherein a majority of the small water droplets have diameters between approximately 0.5 microns and approximately 5.0 microns.

* * * * *